US008780127B2

(12) United States Patent
Takeishi

(10) Patent No.: US 8,780,127 B2
(45) Date of Patent: Jul. 15, 2014

(54) IMAGE FORMING APPARATUS, METHOD FOR CONTROLLING SAME, AND STORAGE MEDIUM

(75) Inventor: Hiroki Takeishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/447,978

(22) Filed: Apr. 16, 2012

(65) Prior Publication Data

US 2012/0287451 A1 Nov. 15, 2012

(30) Foreign Application Priority Data

May 9, 2011 (JP) ................. 2011-103978

(51) Int. Cl.
| | | |
|---|---|---|
| G06T 11/40 | (2006.01) | |
| G09G 5/36 | (2006.01) | |
| G06T 1/00 | (2006.01) | |
| G06T 15/00 | (2011.01) | |
| G06K 15/02 | (2006.01) | |
| G06F 3/12 | (2006.01) | |

(52) U.S. Cl.
CPC .......... *G06K 15/1888* (2013.01); *G06F 3/1243* (2013.01)
USPC ............................ 345/552; 345/557; 345/522

(58) Field of Classification Search
CPC ..................................................... G06F 3/1243
USPC .......................................... 345/552, 557, 522
See application file for complete search history.

(56) References Cited

U.S. PATENT DOCUMENTS

| | | | | |
|---|---|---|---|---|
| 6,014,224 A | * | 1/2000 | Mitani ........................ | 358/1.16 |
| 6,441,919 B1 | * | 8/2002 | Parker et al. ................ | 358/1.18 |
| 6,662,270 B1 | * | 12/2003 | Sans et al. ..................... | 711/118 |
| 7,069,327 B1 | * | 6/2006 | Fabre ............................ | 709/227 |
| 8,223,387 B2 | * | 7/2012 | Nakao et al. ................. | 358/1.18 |
| 2005/0162676 A1 | * | 7/2005 | Aoki ............................. | 358/1.13 |
| 2009/0257084 A1 | * | 10/2009 | Sakamoto .................... | 358/1.15 |
| 2010/0060935 A1 | * | 3/2010 | Nakao et al. ................. | 358/1.18 |
| 2010/0060936 A1 | * | 3/2010 | Shitara et al. ................ | 358/1.18 |
| 2010/0115462 A1 | * | 5/2010 | Spencer et al. .............. | 715/800 |
| 2010/0149091 A1 | * | 6/2010 | Kota et al. .................... | 345/156 |
| 2010/0177342 A1 | | 7/2010 | Takeishi | |
| 2011/0013209 A1 | * | 1/2011 | Yamazaki ..................... | 358/1.9 |
| 2011/0141508 A1 | * | 6/2011 | Inoue et al. .................. | 358/1.13 |
| 2013/0027750 A1 | * | 1/2013 | Hinds et al. .................. | 358/1.18 |

FOREIGN PATENT DOCUMENTS

| | | |
|---|---|---|
| JP | 2004268553 A | 9/2004 |
| JP | 2010173236 A | 8/2010 |

* cited by examiner

*Primary Examiner* — David T Welch
(74) *Attorney, Agent, or Firm* — Fitzpatrick, Cella, Harper & Scinto

(57) ABSTRACT

A printer interprets the input print data and determines whether or not a rendering command targeted for reusable data included in print data depends on a placement location for placement of the rendering result in a physical coordinate space based on the interpretation result of the PDL data. When the rendering command depends on a placement location for placement of the rendering result in a physical coordinate space, the printer generates cache data without graphic processing for the rendering command targeted for reusable data and stores the generated cache data in a storage unit. When the rendering command does not depend on a placement location for placement of the rendering result in a physical coordinate space, the printer performs graphic processing for the rendering command targeted for the reusable data, generates cache data based on the result of the graphic processing, and stores the generated cache data in a storage unit.

9 Claims, 11 Drawing Sheets

IMAGE FORMING APPARATUS, METHOD FOR CONTROLLING SAME, AND STORAGE MEDIUM

BACKGROUND OF THE INVENTION

1. Field of the Invention

The present invention relates to an image forming apparatus, a method for controlling the same, and a storage medium.

2. Description of the Related Art

A description will be given of a conventional image formation process. An image forming apparatus that interprets print data such as page description language (hereinafter referred to as "PDL") data to thereby generate bitmap data for image formation has been proposed. Firstly, the image forming apparatus performs interpretation processing for interpreting PDL data. Next, the image forming apparatus performs graphic processing for a rendering command in PDL data based on the result of the interpretation processing for PDL data.

Graphic processing is processing for converting a high-level rendering command in PDL data into a simple fill rendering command or the like. Next, the image forming apparatus generates intermediate data called a display list (DL) based on the post-graphic processing rendering command. Then, the image forming apparatus executes processing for generating bitmap data for image formation, which is called rendering, based on intermediate data. For example, Japanese Patent Laid-Open No. 2004-268553 discloses a printing apparatus that interprets an intermediate language and outputs a raster image and an attribute bit as image data to thereby realize high image-quality print output using the output attribute bit.

Next, a description will be given of a conventional VDP technology. A VDP technology such as PPML for defining reusable data in a specification of PDL data format has been proposed. PPML data can enclose other PDL data as content data in PDL data. Examples of PDL data that can be enclosed in PPML data includes PDL data required for high-level graphic processing such as PostScript® or PDF.

PostScript® and PDF have a high-level rendering command such as a pattern rendering command (e.g., pattern dictionary) which enables repetition rendering. Also, PostScript® and PDF have physical pixel space aware stroke rendering processing. For example, as physical pixel space aware stroke rendering processing, PostScript® and PDF have a command for realizing high image-quality rendering represented by Automatic Stroke Adjustment. Furthermore, PPML data can also enclose raster image data such as TIFF.

The image forming apparatus (printer) can perform PDL data interpretation processing taking advantage of the explicit fact that whether or not the enclosed PDL data is reusable data to thereby cache reusable data subjected to graphic processing.

A printer reuses and arranges the cached reusable data (cache data) on the planes of different paper sheets. With this arrangement, a printer can perform interpretation processing for PDL data enclosing reusable data for pattern rendering. Furthermore, a printer can reduce the time elapsed until intermediate data is generated by performing graphic processing for a rendering command in PDL data or the time elapsed until bitmap data for image formation is generated (rendering processing). For example, Japanese Patent Laid-Open No. 2010-173236 discloses an image forming apparatus that reuses object data such as variable data.

Next, a description will be given of PostScript®. There is no definition of a method for installing PostScript®. However, summary of the algorithm of interpretation processing, graphic processing, and rendering processing for PDL data is defined as a predetermined specification. Here, a placement location for placement of a rendering command on a logical space depends on the rendering result on a physical pixel space. The reasons will be described below.

PostScript language has a function that controls a device for outputting a raster bitmap such as a printer or the like. The device which is capable of outputting a raster bitmap on a visible medium determines the color of a cell in a discrete device space, which is a set of pixels, in accordance with PostScript data. The device determines the color of a raster bitmap to thereby realize the formation of a visible image rendered by a character rendering command, stroke, a fill rendering command, a raster bitmap rendering command, or the like described in PostScript data.

In order to form a raster bitmap in accordance with the specification of PostScript, a printer that interprets PostScript so as to form an image needs to convert abstract information not into color information on a raster bitmap but into information having a low degree of abstraction. Abstract information includes a character rendering command, stroke, a fill rendering command, a raster bitmap rendering command, or the like. These rendering commands have information about a logical coordinate system independent of a device space.

Since a rendering command is a logical coordinate system, the rendering command can have three types of information: (1) continuous (indiscrete) coordinate information, (2) a rendering command involving an arithmetic operation for determining a rendering position, (3) a rendering command needing the stored procedure to determine rendering content. In order to convert these information into a device space, a printer uses a scanning converter. The scanning converter converts each rendering command into a frame buffer or discrete information on a display list (DL) in accordance with the result of interpretation of the rendering command. For example, when the scanning converter receives graphics such as a circle, the scanning converter determines whether or not each pixel lies outside or inside the specified range of the rendering command. The scanning converter determines color information about each pixel based on the determination result.

Next, a description will be given of graphic processing in PostScript. Examples of rendering commands in PostScript mainly includes as follows:

| | |
|---|---|
| Fill | To fill the specified region |
| Stroke | To render a line |
| Image | To render a raster bitmap |
| Show | To render a glyph (visible shape of character information) |

Furthermore, one of rendering commands for designating color information includes as follows:

| | |
|---|---|
| Make pattern | To generate pattern |

The printer performs graphic processing for the rendering commands and then performs rendering processing to thereby obtain the rendering result. A path construction algorithm is processing corresponding to graphic processing. The rendering commands such as fill, stroke, or show render a current path using parameters in the rendering commands. The path is configured by segments and curves describing graphics and its position. Segments and curves are obtained by continuously executing a path construction command. For example, the path construction command is realized by commands such as newpath, moveto, lineto, curveto, arc, closepath, and the like.

The printer renders the rendering commands by repeating the following processing (a) to (c) while using the current path obtained in accordance with the path construction command:

(a) Data interpretation is executed in accordance with the language specification in PostScript.

(b) Current path is constructed by executing the path construction command.

(c) Drawing command is executed.

Next, a description will be given of rendering processing as mapping processing for mapping data to a device coordinate. In order to obtain the rendering result, a printer needs to convert a logical space having a high degree of abstraction in a rendering command to a device space during interpretation of the rendering command described above. This process is classified into rendering processing.

A device space to be subjected to rendering processing is based on a set of color information associated with discrete information called a plurality of pixels. On the other hand, information on a logical space described in a rendering command maintains a description independent of individual equipment such as a printer by being independent of a device space. In other words, a rendering command on a logical space is information which is not constrained by its unit or a position on any grid. Thus, PostScript data can freely specify a rendering position by using an arithmetic operation on a logical space independent of a device space.

For example, examples of commands for performing an arithmetic operation for designating a position include commands such as translate, rotate, scale, and the like. The printer converts information on such an abstract logical space into information on a device space in accordance with a current conversion matrix. The printer performs linear conversion for each rendering command using a current conversion matrix, and thus, continuous positional information on a device space can be obtained. Also, a printer further converts positional information on a device space into discrete information to thereby obtain a set of color information associated with discrete information called a plurality of pixels. Rules for converting positional information on a device space into discrete information are the scan conversion rules.

The scan conversion rules in PostScript have the following definition. Coordinates and pixels are expressed by a device space. Graphics refers to a path to be rendered by a current color or image. A path coordinate values is mapped to a device space. During mapping processing, the path coordinate value is not rounded at the boundary of a device pixel. The aforementioned processing is computed based on continuous spatial information.

However, a rendering command is finally converted into discrete information on a device space and is arranged on a pixel. A pixel is a minimum square region constituting a device space. Thus, according to the definition of PostScript, discrete information has coordinate information as follows. For example, when continuous coordinate information about a device coordinate system is (x, y), discrete coordinate information (i, j) is defined as follows:

$$(i, j)=(\text{floor}(x), \text{floor}(y))$$

Here, when regions that belong to the pixel are defined as a set of pixels (x', y'), the following relationships are satisfied: $i \leq x' < i+1$ and $j \leq y' < j+1$. In addition to such definition, PostScript has the following scan conversion rules. In other words, in accordance with the definition of PostScript, the following processing is executed for the pixel on the coordinate regardless of the position on the pixel if continuous coordinate information falls within the range of pixel coordinates in accordance with the definition. In other words, in accordance with the definition of PostScript, a printer maps color information in accordance with a rendering command to the pixel. Such rules are generally referred to as "pixel placement rule".

Next, a description will be given of Automatic Stroke Adjustment processing. In PostScript, a rendering definition for a stroke rendering command is further present. When a path is very thin line on a raster bitmap obtained as a result of rendering processing, it may be seen that a line width is not uniform. In accordance with the aforementioned scan conversion rules, a line width varies depending on the position on a device space. In other words, the number of discrete pixels intersecting a line varies depending on the position on a device space.

In order to obtain a more preferable rendering result, PostScript has the following definition. In other words, processing for making a line width uniform by correcting the rendering result obtained by rendering processing is defined. During the aforementioned processing, the following Automatic Stroke Adjustment processing needs to be performed by taking into account continuous coordinate values of a stroke rendering command and the position in a discrete device space.

In other words, Automatic Stroke Adjustment processing is processing for adjusting a line width and its end point such that the maximum error is lower than ½ pixel. Furthermore, when a line width after being converted on a device space is lower than ½ pixel, the line width is corrected so as to be one pixel width by Automatic Stroke Adjustment processing.

As described above, for the rendering command of PostScript, positional information is converted using a current conversion matrix in a discrete device space. Furthermore, it has a nature that which pixel to be filled cannot be determined until pixel placement rules depending on pixels in a discrete space are applied.

It should be noted that Automatic Stroke Adjustment processing can be switched between enabled and disabled states by a set stroke adjustment command. An argument of the set stroke adjustment command is a logical type.

The rendering position of PDL data which can enclose PostScript such as PPML or the like is determined after PostScript interpretation processing performed by a printer. However, as in the aforementioned stroke rendering processing, PostScript rendering processing is a rendering depending on the mapping between a user space and a device space during interpretation of PostScript. In other words, in accordance with the specification of PostScript, a printer needs to perform rendering in a space independent of a PPML rendering space.

Next, a description will be given of a pattern rendering command. The pattern rendering command in PostScript is a repetition rendering command for repeatedly rendering small graphics called pattern cells. Thus, in order to perform rendering based on the pattern rendering command, a printer needs to execute processes such as construction of the rendering of pattern cells, specification of a region, rendering by spreading pattern cells, or the like.

The rendering state of cells can be defined by a PaintProc command. The pattern rendering command can be defined by registering the PaintProc command in a Tilling Pattern dictionary. When a make pattern command is executed for the Tilling Pattern dictionary, a printer performs pattern rendering processing in a pattern coordinate system.

The pattern coordinate system depends on a current conversion matrix and matrix parameters upon execution of the make pattern command. Thus, the pattern coordinate system is fixed to a user coordinate system upon execution of the make pattern command. In other words, the size and the shape of a pattern cell are rendered in a coordinate system independent of a current conversion matrix or the like. Thus, a cell spreading method depends on rendering at a position on a virtual paper plane called a user space.

The rendering position of PDL data which can enclose PostScript such as PPML or the like is determined after PostScript interpretation processing. However, pattern rendering is rendering depending on a user space during interpretation of PostScript. In other words, in accordance with the specification of PostScript, a printer needs to perform rendering in a space independent of a PPML rendering space.

However, in the conventional VDP technology, there is no cache method depending on the feature of the enclosed PDL data. Thus, print processing satisfying both high quality and high speed printing cannot be realized. For example, the pattern rendering command (pattern dictionary) for PostScript® and PDF depends on the rendering position on a paper plane.

In other words, the pattern rendering command determines whether or not rendering is repeated from which position depending on the rendering position on a paper plane. In such a prior art, cache data is stored as raster bitmap data or post-PDL data interpretation processing intermediate data. In any cache data storing method, the rendering result depending on PDL data interpretation during caching is cached. Thus, when a printer performs rendering at different positions upon reuse of cache data, the printer cannot determine whether or not rendering is repeated by starting from which position in consideration of a correct rendering position on a paper plane. In other words, rendering deficiencies may occur.

For the Automatic Stroke Adjustment function in PostScript® and PDF, determining which pixel to be subjected to rendering depends on the position of a physical coordinate space to be subjected to rendering. In other words, the Automatic Stroke Adjustment function determines rendering pixels to be rendered by line rendering depending on the fact that line rendering is performed at which position on a discrete space in which the rendering result is rendered.

However, in the cache data storing method stated above, the rendering result depending on PDL data interpretation during caching is cached. Thus, when a printer performs rendering at different positions upon reuse of cache data, the printer cannot determine whether or not rendering is repeated by starting from which position depending on a rendering position on a paper plane. Consequently, it is difficult to execute rendering in a proper manner.

In other words, in the prior art, when high speed image formation processing is attempted to be realized using cache data which is readily converted into intermediate data, rendering deficiencies may occur. Also, when information independent of the position in a physical coordinate space is cached so as not to occur rendering deficiencies, graphic processing is required upon reuse of cache data. Consequently, it is difficult to reuse cache data at high speed.

SUMMARY OF THE INVENTION

The image forming apparatus of the present invention realizes high speed image formation processing while suppressing the occurrence of rendering deficiencies.

According to an aspect of the present invention, an imaging apparatus is provided that includes an input unit configured to input print data; an interpretation unit configured to interpret the input print data; a first determination unit configured to determine whether or not a rendering command targeted for reusable data included in the print data depends on a placement location for placement of the rendering result in a physical coordinate space based on the interpretation result of the print data; and a cache data generation unit configured to generate cache data corresponding to the reusable data based on the interpretation result of the print data without graphic processing for the rendering command targeted for the reusable data and store the generated cache data in a storage unit when the first determination unit determines that the rendering command depends on a placement location for placement of the rendering result in a physical coordinate space or to perform graphic processing for the rendering command targeted for the reusable data, generate cache data corresponding to the reusable data based on the result of the graphic processing, and store the generated cache data in a storage unit when the first determination unit determines that the rendering command does not depend on a placement location for placement of the rendering result in a physical coordinate space.

When a rendering command targeted for reusable data included in PDL data is a rendering command depending on a placement location for placement of the rendering result in a physical coordinate space, the image forming apparatus of the present embodiment generates cache data without graphic processing for the rendering command. With this arrangement, high quality image formation processing can be executed without rendering deficiencies upon reuse of cache data.

Also, when a rendering command targeted for reusable data included in PDL data is not a rendering command depending on a placement location for placement of the rendering result in a physical coordinate space, the image forming apparatus of the present embodiment performs graphic processing for the rendering command to thereby generate cache data. By allowing reuse of cache data, high speed image formation processing can be realized while reducing an image processing time.

Further features of the present invention will become apparent from the following description of exemplary embodiments with reference to the attached renderings.

DESCRIPTION OF THE EMBODIMENTS

Figure 1:
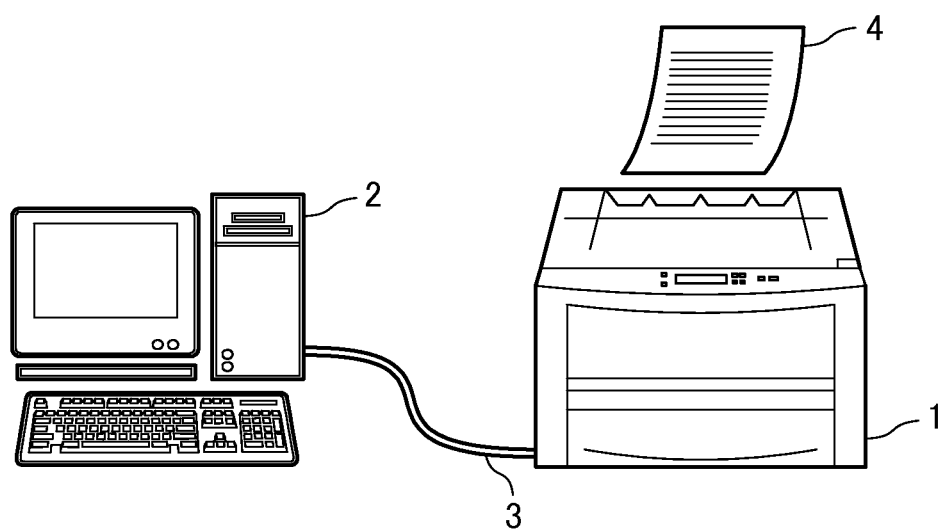
FIG. 1 is a diagram illustrating the configuration of PDL data.

FIG. 1 is a diagram illustrating the configuration of the system of the present embodiment. The system shown in FIG. 1 includes a personal computer 2 and a printer 1. The personal computer 2 and the printer 1 are communicatable with each other via a predetermined communication interface 3.

The personal computer 2 operates application, middleware, or driver software to thereby generate PDL data. The personal computer 2 inputs the generated PDL data to the printer 1. The personal computer 2 may be mobile information equipment, a work station, a main frame, storage, or the like. The printer 1 is the image forming apparatus of the present embodiment. The printer 1 generates image data by performing print processing for the input PDL data, and outputs the generated image data on a visible medium 4. In this example, the visible medium 4 is paper. Instead of the printer 1, any information processing apparatus which is capable of forming visible information on a visible medium, such as a MFP (multi-function printer), printing machine, a display device, an electronic paper device, or the like, may also be used.

Figure 2:
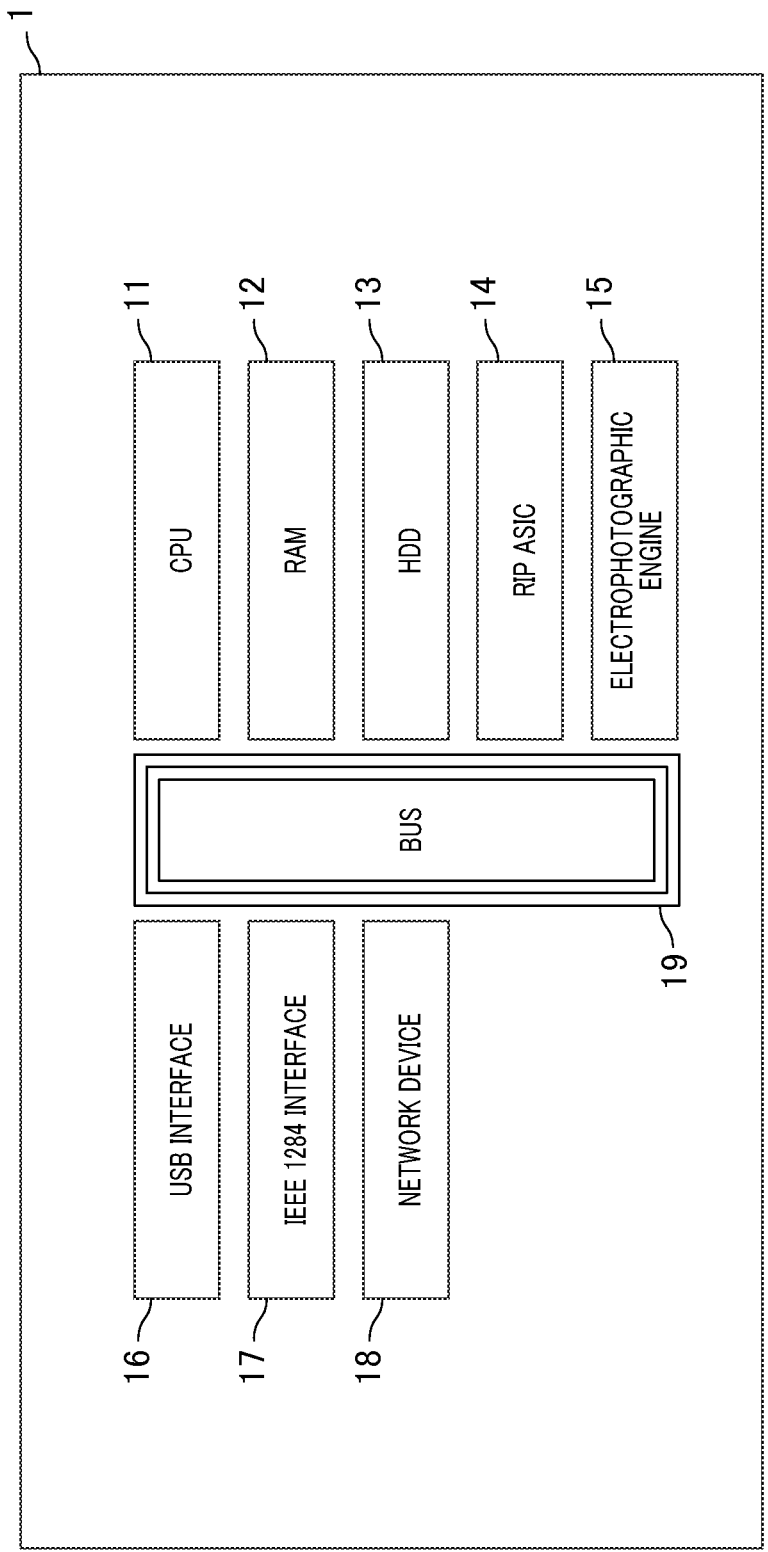
FIG. 2 is a diagram illustrating the configuration of cache data.

FIG. 2 is a diagram illustrating the configuration of a printer. The printer 1 includes a CPU 11, a RAM 12, an HDD 13, an RIP ASIC 14, and an electrophotographic engine 15. The printer 1 further includes a USB interface 16, an IEEE 1284 interface 17, and a network device 18. The CPU 11 to the network device 18 are connected to each other via a bus. A method for controlling the image forming apparatus of the present embodiment is realized by the function of the processing units provided in the printer 1 shown in FIG. 2.

The USB interface 16, the IEEE 1284 interface 17, and the network device 18 functions as an input unit that inputs PDL data from an external device. More specifically, the USB interface 16 inputs PDL data via an external device (e.g., the personal computer 2) compiled with USB standard. Also, the IEEE 1284 interface 17 inputs PDL data via an external device having a IEEE 1284 standard hardware. The network device 18 inputs PDL data from an external device having a network standard hardware.

The CPU 11 exchanges data or a command with processing units connected to a bus 19. For example, the CPU 11 executes PDL data interpretation processing to be described below or the like by executing a command stored in the RAM 12. The RAM 12 is a volatile storage medium. The RAM 12 stores PDL data or a command executed by the CPU 11 via the bus 19. The HDD 13 is a non-volatile storage medium. The HDD 13 stores a program executed by the CPU 11 or data in advance. The program is a computer program that realizes a method for controlling the image forming apparatus of the present embodiment. The RIP ASIC 14 generates raster bitmap data from intermediate data. The electrophotographic engine 15 forms visible information on a visible medium represented by paper using raster bitmap data generated by the RIP ASIC 14.

Figure 3:
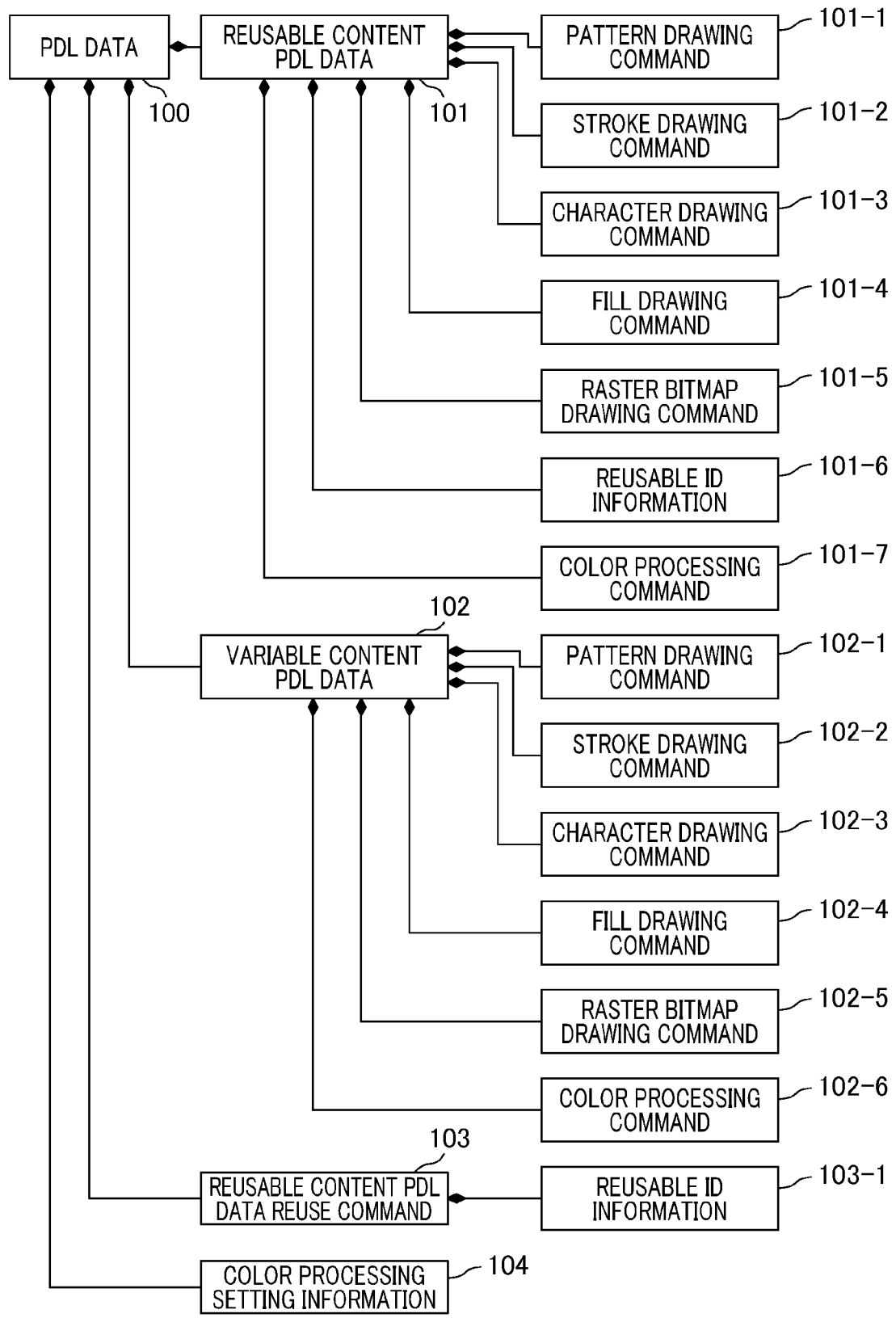
FIG. 3 is a diagram illustrating the configuration of intermediate data.

FIG. 3 is a diagram illustrating an example of the configuration of PDL data. PDL data 100 is PDL data to be processed by the printer 1. The PDL data 100 has a data structure (e.g., PPML) appropriate for a VDP technology. In other words, the PDL data 100 can enclose variable content PDL data 102 and reusable content PDL data 101. Content PDL data can have a pattern rendering command 101-1/102-1, a stroke rendering command 101-2/102-2, and a character rendering command 101-3/102-3. Also, content PDL data can have a fill rendering command 101-4/102-4, and a raster bitmap rendering command 101-5/102-5.

A pattern rendering command has a function corresponding to a pattern rendering command (pattern dictionary) in PostScript®. Also, a stroke rendering command has an Automatic Stroke Adjustment function in PostScript® and PDF. Of course, the PDL data 100 can have rendering commands other than the aforementioned rendering commands.

Reusable ID information 101-6 shown in FIG. 3 is identification information for uniquely identifying the reusable content PDL data 101. Reusable ID information 103-1 is identification information for uniquely identifying reusable content PDL data targeted by a reusable content PDL data reuse command. A color processing command 101-7/102-6 is a command for giving an instruction to execute color processing. Color processing setting information 104 is setting information to be used upon execution of color processing.

Figure 4:
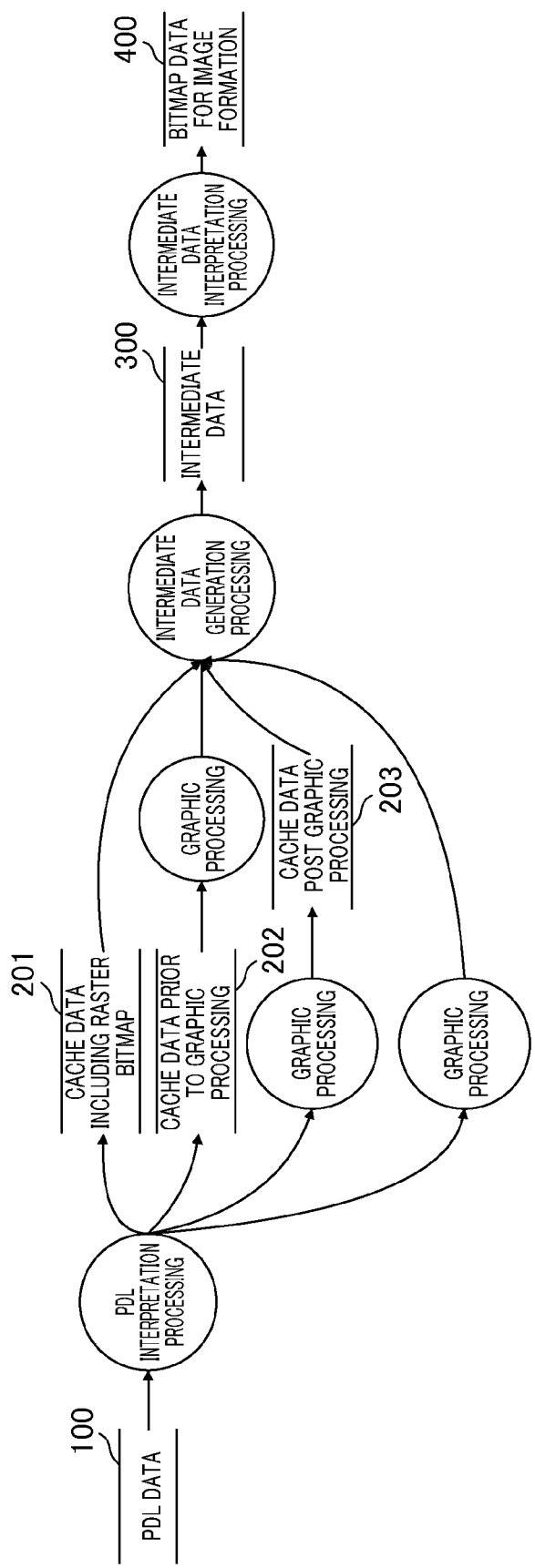
FIG. 4 is a diagram illustrating units provided in a printer.

FIG. 4 is a diagram illustrating PDL data processing performed by a printer. The printer 1 inputs the PDL data 100 and executes PDL data interpretation processing. PDL data interpretation processing is processing for analyzing the content of PDL data. Next, the printer 1 generates cache data 201 or 202 depending on the result of the interpretation processing for PDL data and caches the cache data 201 or 202 in the RAM 12.

The cache data 201 is cache data including a raster bitmap. The cache data 202 is cache data prior to graphic processing. Also, the printer 1 performs graphic processing for a rendering command included in PDL data depending on the result of the interpretation processing for PDL data. Further, the printer 1 performs graphic processing for a rendering command included in PDL data depending on the result of the interpretation processing for PDL data and generates cache data 203 to thereby cache the generated cache data 203 in the RAM 12.

Next, the printer 1 executes intermediate data generation processing. The printer 1 generates intermediate data 300 by reusing the cache data 201 or 203. Alternatively, the printer 1 performs graphic processing for the cache data 202 and generates the intermediate data 300. The printer 1 may generate the intermediate data 300 using the result of graphic processing for a rendering command included in PDL data depending on the result of the interpretation processing for PDL data. Then, the printer 1 generates, the intermediate data 300 interprets, bitmap data 400 for image formation.

Figure 5A:
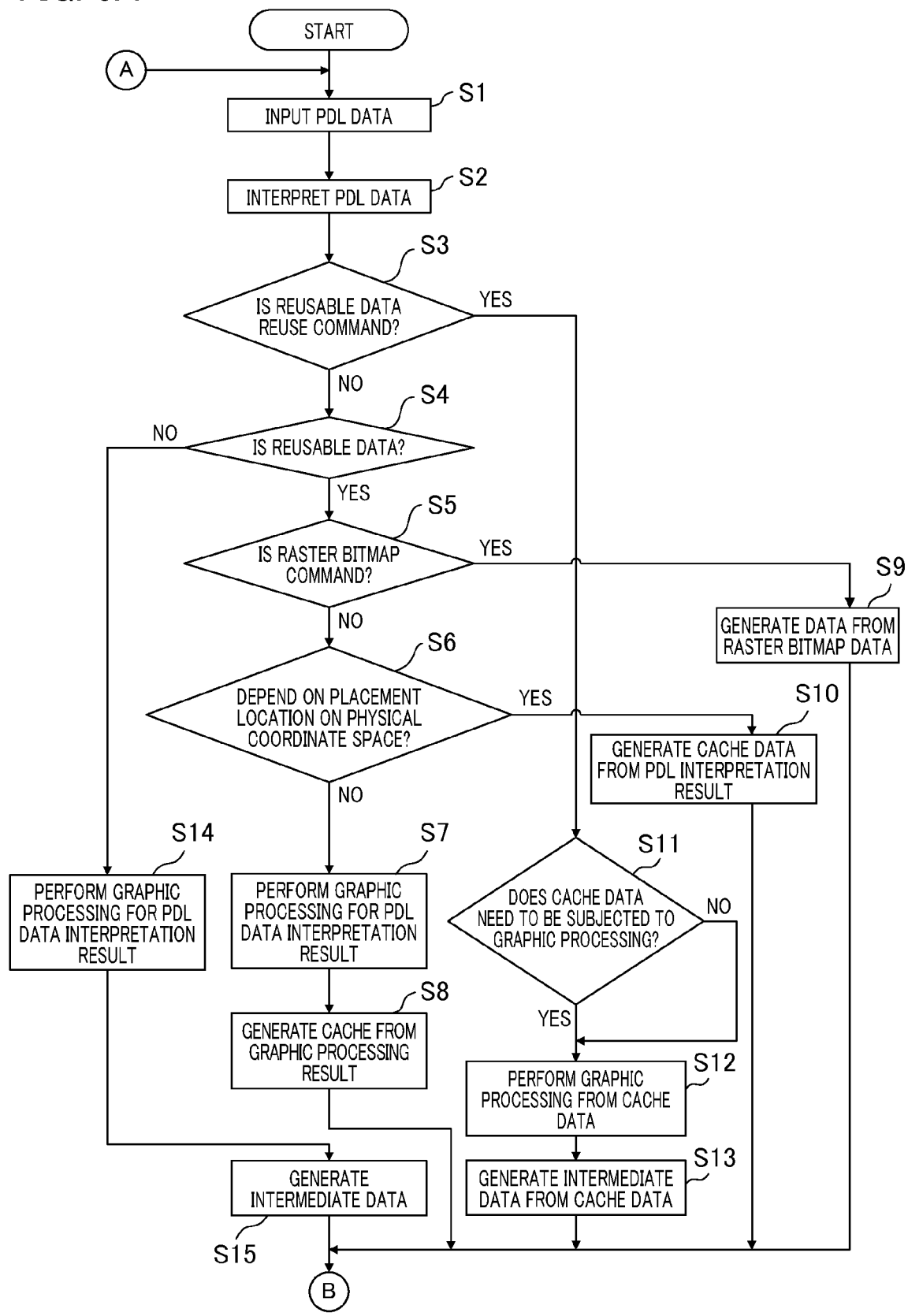
FIGS. 5A and 5B are diagrams illustrating the data flow of the present invention.
Figure 5B:
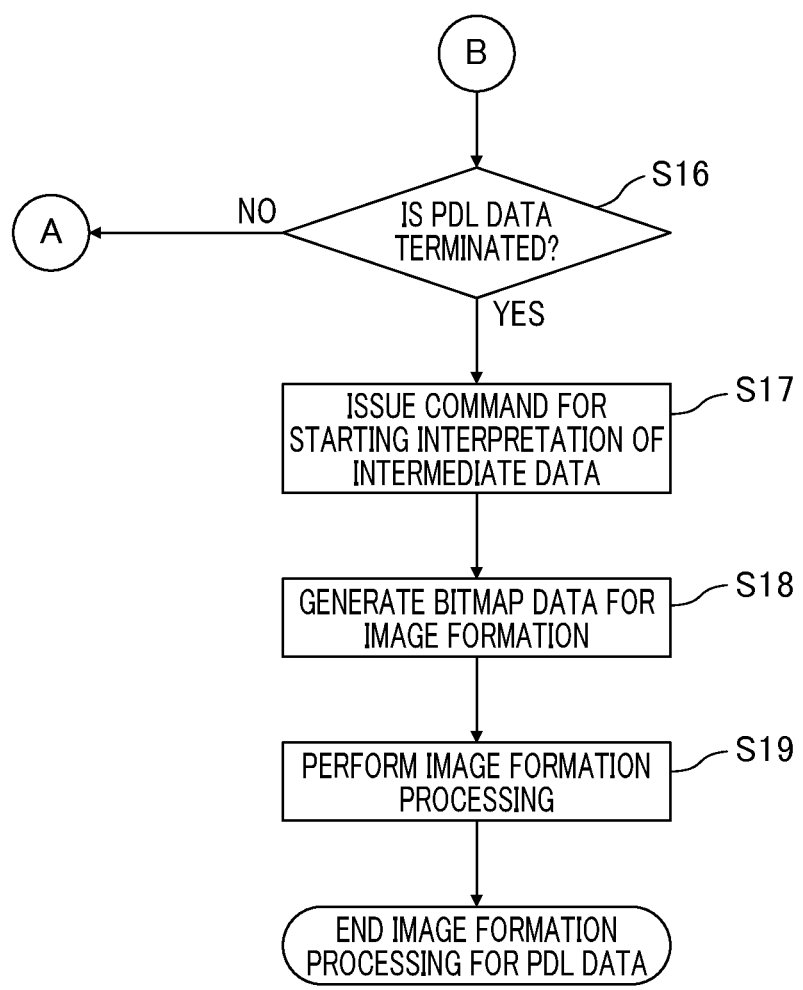

FIGS. 5A and 5B are flowcharts illustrating an example of operation processing performed by a printer. Firstly, the printer 1 inputs the PDL data 100 and writes the PDL data 100 to the RAM 12 (step S1). Next, the CPU 11 of the printer 1 functions as an interpretation unit that executes interpretation processing for the PDL data 100 written to the RAM 12 (step S2).

Next, the CPU 11 functions as a second determination unit. In other words, the CPU 11 determines whether or not a command to be executed among commands included in the PDL data 100 read by interpretation processing in step S2 is a reusable content PDL data reuse command 103 (FIG. 3) (step S3). The reusable content PDL data reuse command 103 is a command for giving an instruction to generate intermediate data by reusing cache data reuses.

When the command to be executed is the reusable content PDL data reuse command 103, the CPU 11 functions as a third determination unit. In other words, the CPU 11 determines whether or not a rendering command included in cache data needs to be subjected to graphic processing (step S11). When a rendering command included in cache data does not need to be subjected to graphic processing, the process advances to step S13. When a rendering command included in cache data needs to be subjected to graphic processing, the CPU 11 executes graphic processing for cache data (step S12). Then, the CPU 11 interprets cache data and generates intermediate data (step S13), and the process advances to step S16.

When the command to be executed is not the reusable content PDL data reuse command 103, the CPU 11 executes the following processing. The CPU 11 determines whether or not the content PDL included in the PDL data 100 read by interpretation processing in step S2 is the reusable content PDL data (hereinafter referred to as "reusable data") 103 (step S4).

When the content PDL included in the PDL data 100 is not the reusable data 103 but the variable content PDL data 102, the process advances to step S14. Then, the CPU 11 executes graphic processing for a rendering command included in the PDL data 100 read by interpretation processing in step S2 (step S14), and the process advances to step S15.

In the present embodiment, graphic processing includes the following processing which is defined by the specification of at least PostScript®.

Figure 6B:
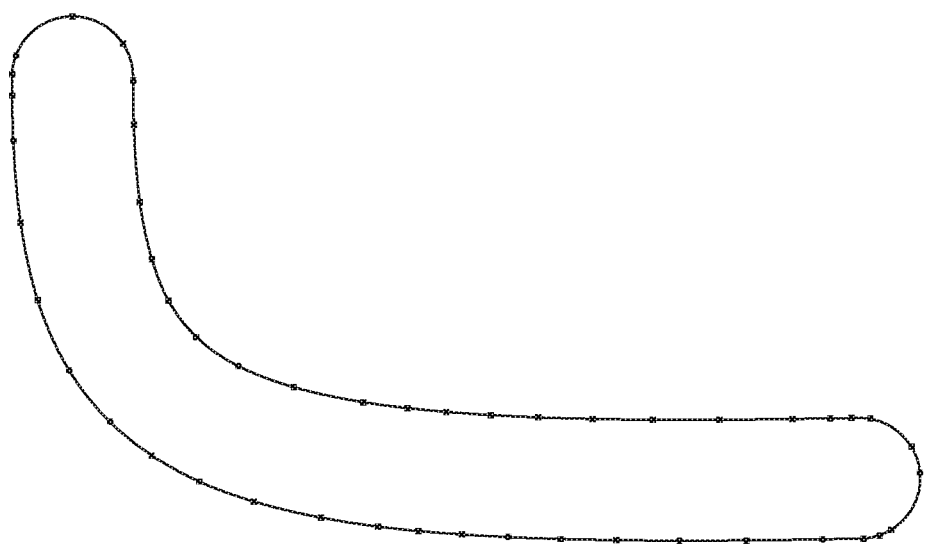
FIGS. 6A and 6B are diagrams illustrating the result of rendering processing.
Figure 6A:
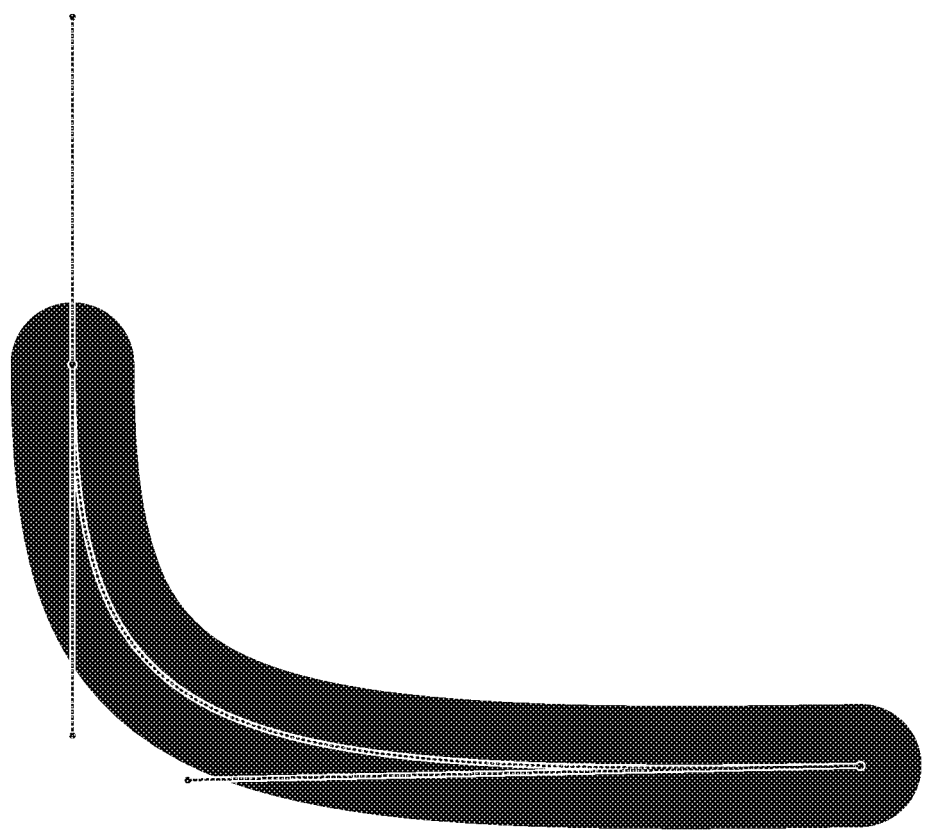

CTM conversion processing
flatten path processing
Automatic Stroke Adjustment processing
Patterns processing FIG. 6 is a diagram illustrating flatten path processing. FIG. 6A shows the result of rendering processing for the Bezier curve. FIG. 6B shows the result of flatten path processing for a rendering command which outputs the result of rendering processing shown in FIG. 6A.

Graphic processing is processing for dropping the abstraction of a rendering command included in the PDL data 100 obtained by PDL data interpretation processing (step S2 in FIG. 5A) to the abstraction of the intermediate data 300 which can be interpreted by the RIP ASIC 14.

Figure 7:
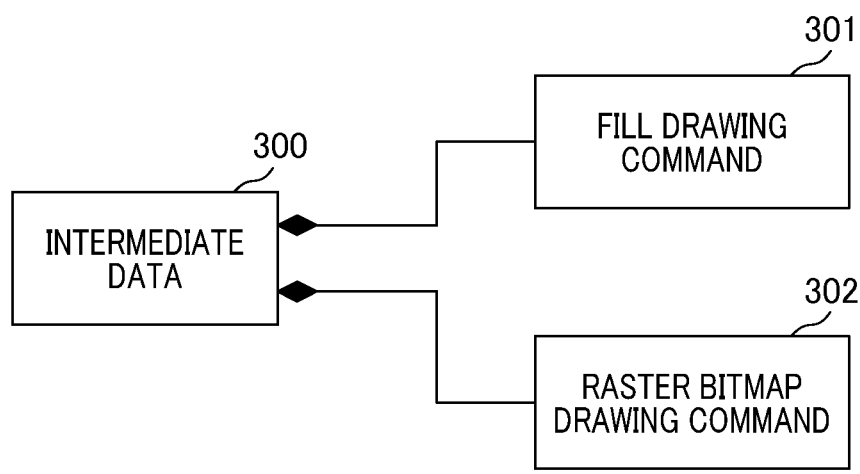
FIG. 7 is a diagram illustrating processing executed by a stroke rendering command.

In the PDL data 100, there is a high-level rendering command (e.g., stroke rendering command) in which a shape to be rendered cannot be specified without execution of a high-level arithmetic operation such as line width specification, Bezier curve information, or the like. On the other hand, the RIP ASIC 14 cannot process a high-level rendering command included in the PDL data 100. Thus, the intermediate data 300 to be processed by the RIP ASIC 14 must be a rendering command without the need for a high-level arithmetic operation, such as a fill rendering command or a raster bitmap rendering command. FIG. 7 shows the fill rendering command 301 and the raster bitmap rendering command 302 both included in the intermediate data 300.

As shown in FIG. 6B, a Bezier curve is strengthened by determining the outer profile of the rendering region in a rendering command having high-level information. Thus, the Bezier curve can be converted into information which can be converted into the intermediate data 300 which can be interpreted by the RIP ASIC 14.

Referring back to FIG. 5A, the CPU 11 instructs the RIP ASIC 14 to perform generation processing for intermediate data (step S15), and the process advances to step S16. As a result of generation processing for intermediate data, a rendering command which can be interpreted by the RIP ASIC 14 is generated on the RAM 12.

When it is determined during determination processing in step S4 that the content PDL included in the PDL data 100 is the reusable data 103, the CPU 11 determines whether or not a command included in the read PDL data 100 is a raster bitmap command (step S5). When a command included in the read PDL data 100 is a raster bitmap command, the process advances to step S9. Then, the CPU 11 generates cache data based on the raster image included in the raster bitmap command and the reusable ID information 103-1 (FIG. 3) included in the PDL data 100, and stores the generated cache data in the RAM 12 (step S9).

When a command included in the read PDL data 100 is not a raster bitmap command, the CPU 11 determines whether or not a command included in the PDL data 100 is a rendering command depending on a placement location for placement of the rendering result in a physical coordinate space (step S6). In other words, the CPU 11 functions as a first determination unit that determines whether or not a rendering command targeted for reusable data included in the PDL data depends on a placement location for placement of the rendering result in a physical coordinate space based on the interpretation result of the PDL data.

In the case of PostScript® data processing, a rendering command depending on a placement location for placement of the rendering result in a physical coordinate space is, for example, the following rendering command.

Pattern rendering command
Stroke rendering command including Automatic Stroke Adjustment processing Thus, the CPU 11 determines whether or not a rendering command included in the PDL data 100 is a pattern rendering command, and, when the rendering command includes the pattern rendering command, determines that the rendering command depends on a placement location for placement of the rendering result in a physical coordinate space. Also, the CPU 11 determines whether or not a rendering command included in the PDL data 100 includes a stroke rendering command required for execution of stroke automatic adjustment processing. When the rendering command includes the stroke rendering command required for execution of stroke automatic adjustment processing, the CPU 11 determines that the rendering command depends on a placement location for placement of the rendering result in a physical coordinate space.

When a rendering command included in the PDL data 100 is a rendering command depending on a placement location for placement of the rendering result in a physical coordinate space, the CPU 11 does not execute graphic processing. Then, the process advances to step S10. Next, the CPU 11 generates cache data based on the result of interpretation of the PDL data 100 (step S2) and the reusable ID information 103-1 in the PDL data 100, and stores the generated cache data in the RAM 12 (step S10). Then, the process advances to step S16.

In other words, the CPU 11 functions as a cache data generation unit that executes the following processing when it is determined that the rendering command depends on a placement location for placement of the rendering result in a physical coordinate space. The CPU 11 generates cache data corresponding to the reusable data based on the interpretation result of the PDL data without graphic processing for the rendering command targeted for the reusable data, and stores the generated cache data in a storage unit (RAM).

When a rendering command included in the PDL data 100 is not a rendering command depending on a placement location for placement of the rendering result in a physical coordinate space, the CPU 11 performs graphic processing for the rendering command targeted for reusable data (step S7) based on the result of interpretation of the PDL data 100 (step S2).

Graphic processing to be performed in step S7 includes at least the following processing among PostScript® data processing.

CTM conversion processing for each rendering command in PDL data

Flatten path processing for a stroke rendering command or a fill rendering command Next, the CPU 11 generates cache data corresponding to reusable data based on the result of graphic processing in step S7 and the reusable ID information 103-1 in the PDL data 100, and stores the generated cache data in the RAM 12 (step S8). Then, the process advances to step S16.

In step S16, the CPU 11 determines whether or not the read PDL data is terminated (step S16). When the read PDL data is not terminated, the process returns to step S1. When the read PDL data is terminated, the CPU 11 executes the following processing. In other words, the CPU 11 passes the location (address information) of the generated intermediate data in the RAM 12 to the RIP ASIC 14, and issues a command for starting interpretation of intermediate data to the RIP ASIC 14 (step S17). Then, the RIP ASIC 14 interprets intermediate data at a position indicated by address information stored in the RAM 12 to thereby generate bitmap data for image formation in the RAM 12 (step S18).

In other words, the CPU 11 functions as a rendering data generation unit. More specifically, when it is determined that cache data does not need to be subjected to graphic processing, the CPU 11 generates rendering data based on the cache data (No in step S11, steps S13 to S18). When it is determined that cache data needs to be subjected to graphic processing, the CPU 11 executes graphic processing for the cache data to thereby generate rendering data (Yes in step S11, steps S12, S13, and S16 to S18).

In step S18, the RIP ASIC 14 further notifies address information about the generated bitmap data for image formation in the RAM 12 to an electrophotographic engine 15. Then, the electrophotographic engine 15 acquires bitmap data for image formation, which is at a position indicated by address information notified from the RIP ASIC 14, from the RAM 12. Then, the electrophotographic engine 15 generates a visible image on a visible medium based on the acquired bitmap data for image formation (step S19).

Figure 8:
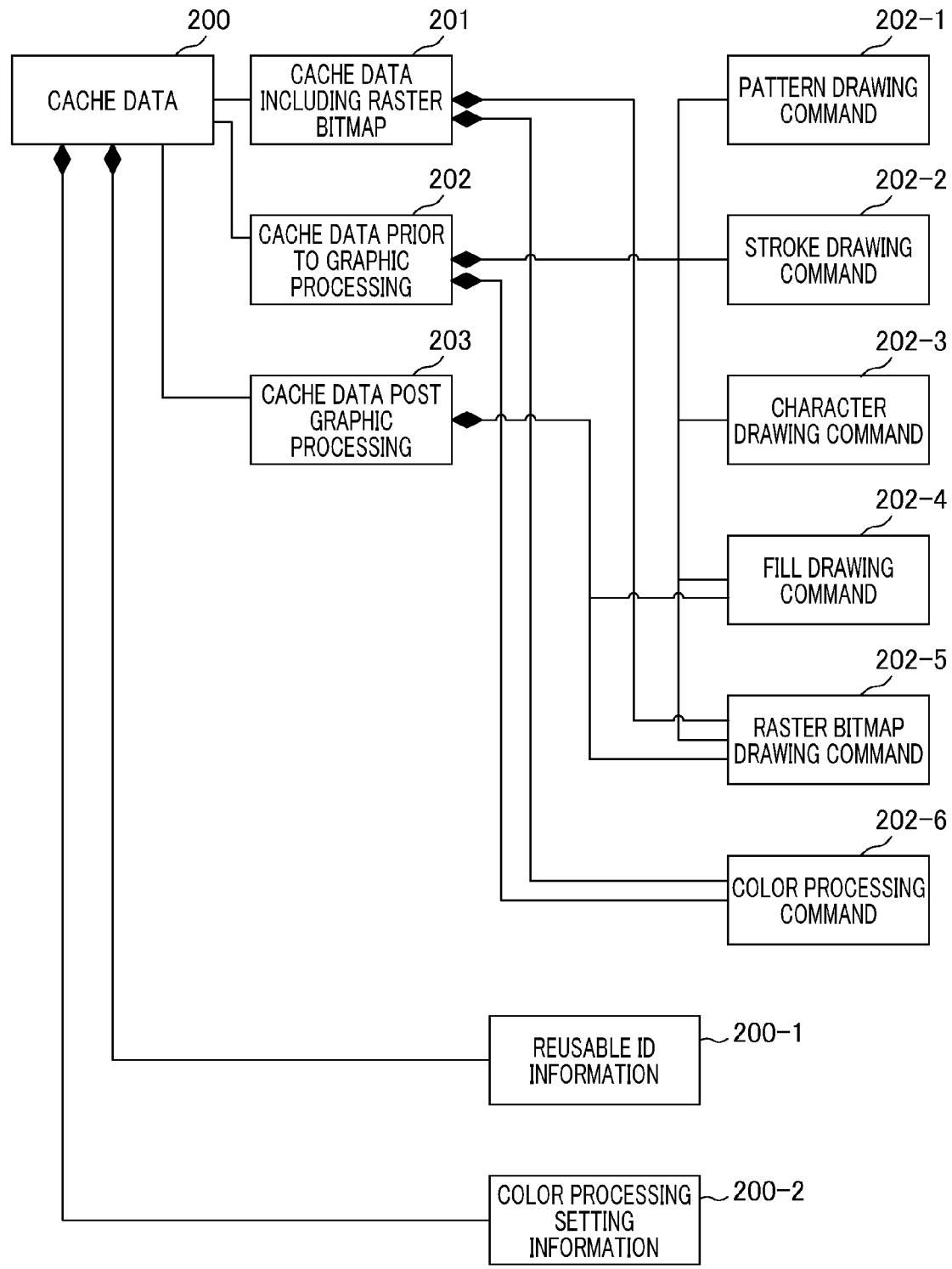
FIG. 8 is a diagram illustrating the configuration of cache data.

FIG. 8 is a diagram illustrating an example of the configuration of cache data stored in RAM according to the present embodiment. Cache data 200 is classified into one of three cache data: the cache data 201 including a raster bitmap, the pre-graphic processing cache data 202, and the post-graphic processing cache data 203.

The cache data 201 can have a raster bitmap rendering command 202-5 and a color processing command 202-6. The cache data 201 is generated when the reusable content PDL data 101 is a raster bitmap image such as TIFF. When the reusable content PDL data 101 includes the raster bitmap rendering command 101-5 (FIG. 3), the CPU 11 generates the cache data 201 based on the raster bitmap rendering command 101-5.

Among rendering commands included in the PDL data 100, the cache data 202 can have a pattern rendering command 202-1, a stroke rendering command 202-2, a character rendering command 202-3, a fill rendering command 202-4, and a raster bitmap rendering command 202-6. The cache data 202 can further have a color processing command 202-6. The cache data 203 can have the fill rendering command 202-4 and the raster bitmap rendering command 202-5. Reusable ID information 200-1 shown in FIG. 8 is identification information for uniquely identifying reusable data targeted by a reusable content PDL data reuse command. A color processing command 200-2 is setting information for use upon execution of the color processing command 202-6.

The CPU 11 generates the intermediate data 300 based on any one of PDL data and the cache data 201 to 203 (FIG. 7). The intermediate data 300 includes a fill rendering command 301 and a raster bitmap rendering command 302.

In other words, since the intermediate data 300 has a rendering command equivalent to the post-graphic processing cache data 203, the costs of conversion processing performed by the CPU 11 are lower than the costs of conversion processing performed by the CPU 11 upon conversion of the pre-graphic processing cache data 202 into the intermediate data 300. Since the post-graphic processing cache data 203 is subjected to graphic processing, the post-graphic processing cache data 203 has limited supportable commands. However, since the post-graphic processing cache data 203 stores a rendering command after being subjected to graphic processing, reuse of the post-graphic processing rendering command ensures to shorten the amount of time required for graphic processing performed by the CPU 11. With this arrangement, the amount of time required for image formation processing executed by the printer 1 can be reduced.

Figure 9A:
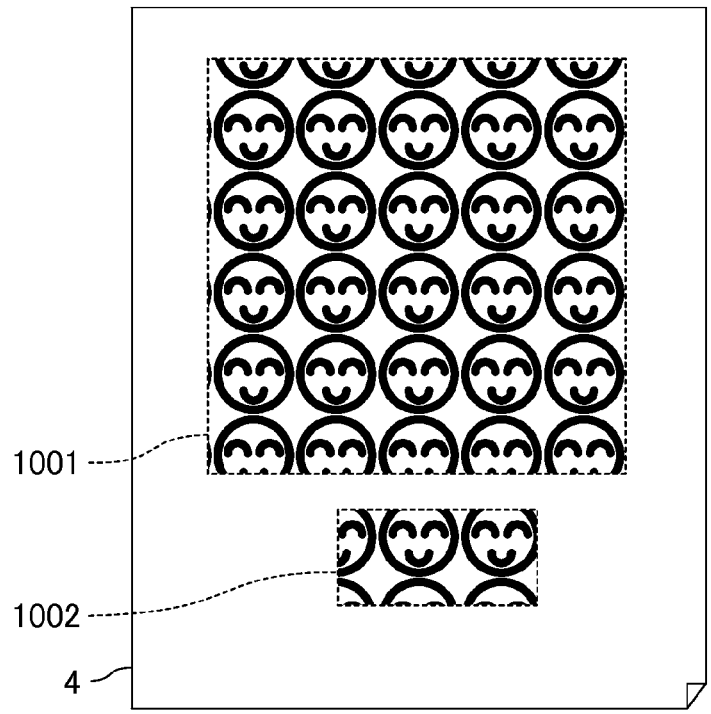
FIG. 9A and FIG. 9B are diagrams illustrating rendering processing executed by a pattern rendering command.
Figure 9B:
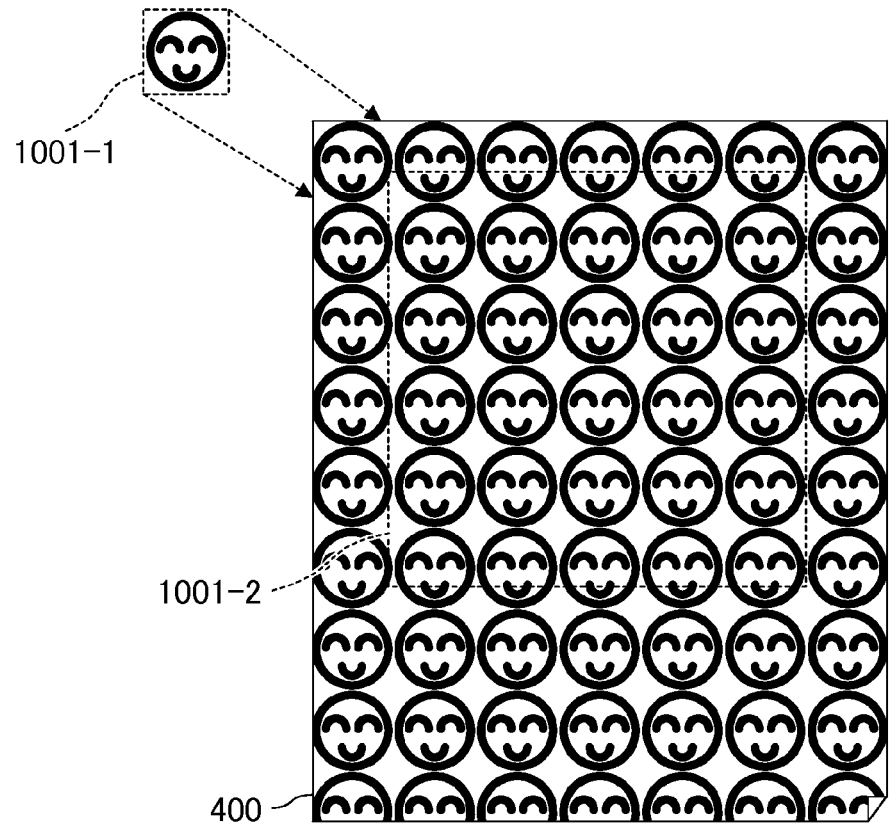

Hereinafter, a description will be given of the effect of the application of the image forming apparatus of the present embodiment with reference to FIGS. 9A, 9B and 10. FIGS. 9A and 9B is a diagram illustrating rendering processing executed by a pattern rendering command. FIG. 9A shows the result of rendering processing executed by a pattern rendering command.

Based on the pattern rendering command in the PDL data 100, the printer 1 can perform pattern rendering for the same graphics element within a specified region on a paper sheet 4 shown in FIG. 9A. The reference numeral 1001 shown in FIG. 9A shows an example of the rendering result based on the pattern rendering command.

FIG. 9B shows an example of the rendering processing method executed by the pattern rendering command. The CPU 11 reads a pattern rendering command in the PDL data 100 or the cache data 200. Firstly, the CPU 11 executes a cell rendering command included in the pattern rendering command. The cell rendering command is a group of rendering commands for one rendering unit to be subjected to pattern rendering by the pattern rendering command. The reference numeral 1001-1 shown in FIG. 9B represents one rendering unit to be subjected to pattern rendering by the pattern rendering command.

The CPU 11 performs graphic processing for the cell rendering command (see steps S12 and S14 shown in FIG. 5A). By means of graphic processing, the cell rendering command is converted into a group of commands that perform pattern rendering from the left corner of the paper sheet 4 in the downward and rightward direction. In this example, the CPU 11 converts the cell rendering command into a group of commands that perform pattern rendering from the left corner of the paper sheet 4. However, the CPU 11 may also convert the cell rendering command into a group of commands that perform pattern rendering from another corner of the paper sheet 4.

Next, the CPU 11 executes a pattern rendering region designating command included in the pattern rendering command. The pattern rendering region designating command is a command for designating a region (a region to be rendered) to be subjected to pattern rendering by the pattern rendering command. In this example, the pattern rendering region designating command designates a region 1001-2 shown in FIG. 9B as a region to be rendered.

The CPU 11 generates the intermediate data 300, which has a pattern rendering command for a region to be rendered indicated by the pattern rendering region designating command, based on the PDL data 100 or the cache data 200.

A group of rendering commands included in the pattern rendering command in intermediate data includes a fill rendering command and a raster bitmap rendering command. In other words, pattern rendering information in the pattern rendering command is lost and only information regarding where and how rendering is performed on the paper sheet 4 remains.

Here, the pattern rendering command is an exemplary command which obtains a different rendering result depending on where rendering is performed on a paper plane. The origin from which rendering is started by the pattern rendering command is always the corner of a paper sheet. Thus, the rendering result for the rendering region on the paper sheet 4 may vary depending on the position of a designated region to be rendered.

When a region 1001-2 to be rendered shown in FIG. 9B is designated, the rendering result in which the rendering start position is from a substantially lower half portion of a personal face is rendered on the paper sheet 4 as shown FIG. 9A. However, when a region to be rendered different from the region 1001-2 to be rendered, the rendering result in which the rendering start position is from a substantially right half portion of a personal face is rendered on the paper sheet 4 as shown in the reference numeral 1002 in FIG. 9A.

Thus, in the case where cache data to be reused includes the post-graphic processing pattern rendering command, rendering is started from a position different from the original rendering start position if rendering is performed by reusing the cache data (rendering deficiencies occur).

The image forming apparatus of the present embodiment (the printer 1) generates cache data without execution of graphic processing when a command included in the PDL data 100 is a pattern rendering command. Then, graphic processing is executed upon reuse of the cache data. Thus, according to the image forming apparatus of the present embodiment, a high-quality rendering result may be obtained without rendering deficiencies.

Figure 10:
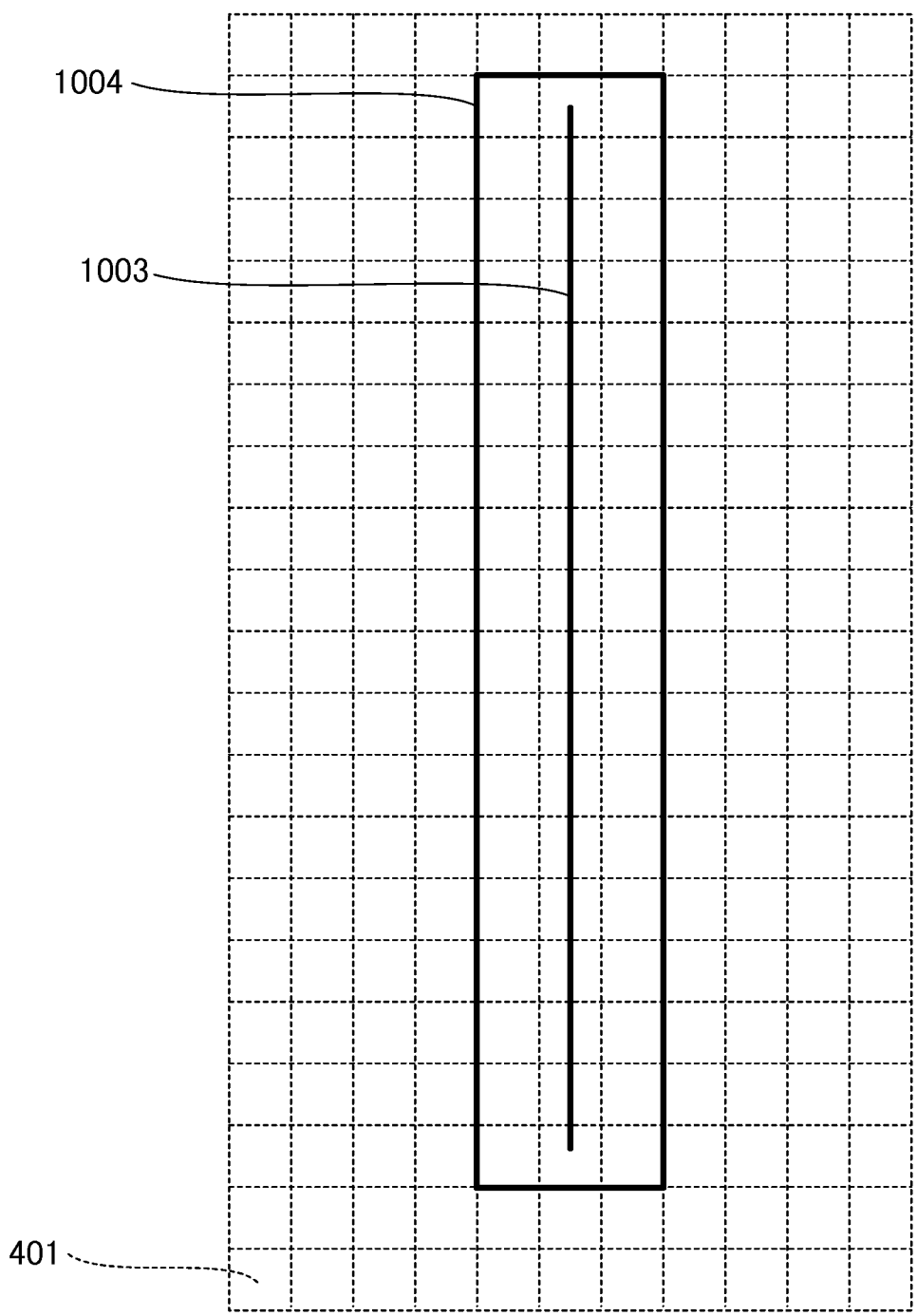
FIG. 10 is a diagram illustrating Automatic Stroke Adjustment processing.

FIG. 10 is a diagram illustrating Automatic Stroke Adjustment processing. Automatic Stroke Adjustment processing is processing to be executed when the stroke rendering command included in the PDL data 100 is converted into the fill rendering command.

As shown in FIG. 10, the stroke rendering command is converted into the fill rendering command based on the position of each pixel 401 in a discrete space (device pixel space) on bitmap data for image formation. The reference numeral 1003 shown in FIG. 10 represents the rendering result obtained by the execution of the stroke rendering command. The reference numeral 1004 represents the rendering result obtained by the fill rendering command when Automatic Stroke Adjustment processing is not performed.

Automatic Stroke Adjustment processing is processing for controlling a line width of the rendering result so as to be uniform by controlling pixels to be filled. Processing for converting a stroke rendering command into a fill rendering command for controlling a line width of the rendering result so as to be uniform is performed during graphic processing.

Automatic Stroke Adjustment processing is processing depending on the rendering position on a device pixel space. Thus, when the CPU 11 performs graphic processing for the stroke rendering command including Automatic Stroke Adjustment processing to thereby generate cache data, rendering deficiencies occur upon reuse of the cache data.

The image forming apparatus of the present embodiment generates cache data without execution of graphic processing when a command included in the PDL data 100 is a stroke rendering command including Automatic Stroke Adjustment processing. Then, graphic processing is executed upon reuse of the cache data. Thus, according to the image forming apparatus of the present embodiment, a high-quality rendering result may be obtained without rendering deficiencies.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-103978 filed on May 9, 2011, which is hereby incorporated by reference herein in its entirety.

What is claimed is:

1. An imaging apparatus comprising:
    an input unit configured to input print data;
    an interpretation unit configured to interpret the input print data;
    a first determination unit configured to determine whether or not a rendering command targeted for reusable data included in the print data depends on a placement location for placement of the rendering result in a physical coordinate space based on the interpretation result of the print data;
    a cache data generation unit configured to generate cache data corresponding to the reusable data based on the interpretation result of the print data without graphic processing for the rendering command targeted for the reusable data and store the generated cache data in a storage unit when the first determination unit determines that the rendering command depends on a placement location for placement of the rendering result in a physical coordinate space or to perform graphic processing for the rendering command targeted for the reusable data, generate cache data corresponding to the reusable data based on the result of the graphic processing, and store the generated cache data in a storage unit when the first determination unit determines that the rendering command does not depend on a placement location for placement of the rendering result in a physical coordinate space;
    a second determination unit configured to determine whether or not a command to be executed, which is included in the print data, is a command for reusing reusable data;
    a third determination unit configured to determine whether or not cache data corresponding to the reusable data stored in the storage unit needs to be subjected to graphic processing when the second determination unit determines that the command to be executed is the command for reusing reusable data; and
    a rendering data generation unit configured to generate rendering data based on the cache data when the third determination unit determines that the cache data does not need to be subjected to graphic processing or to execute the graphic processing for the cache data to thereby generate rendering data when the third determination unit determines that the cache data needs to be subjected to graphic processing.

2. The imaging apparatus according to claim 1, wherein the first determination unit determines whether or not a rendering command targeted for reusable data included in the print data includes a pattern rendering command, and determines that the rendering command depends on a placement location for placement of the rendering result in a physical coordinate space when the rendering command includes the pattern rendering command.

3. The imaging apparatus according to claim 1, wherein the first determination unit determines whether or not a rendering command targeted for reusable data included in the print data includes a stroke rendering command required for execution of stroke automatic adjustment processing, and determines that the rendering command depends on a placement location for placement of the rendering result in a physical coordinate space when the rendering command includes the stroke rendering command required for execution of stroke automatic adjustment processing.

4. A method for controlling an imaging apparatus, comprising:
inputting print data;
interpreting the input print data;
determining whether or not a rendering command targeted for reusable data included in the print data depends on a placement location for placement of the rendering result in a physical coordinate space based on the interpretation result of the print data;
generating cache data corresponding to the reusable data based on the interpretation result of the print data without graphic processing for the rendering command targeted for the reusable data and storing the generated cache data in a storage unit when it is determined that the rendering command depends on a placement location for placement of the rendering result in a physical coordinate space or performing graphic processing for the rendering command targeted for the reusable data, generating cache data corresponding to the reusable data based on the result of the graphic processing, and storing the generated cache data in a storage unit when it is determined that the rendering command does not depend on a placement location for placement of the rendering result in a physical coordinate space;
determining whether or not a command to be executed, which is included in the print data, is a command for reusing reusable data;
determining whether or not cache data corresponding to the reusable data stored in the storage unit needs to be subjected to graphic processing when the command to be executed is determined that the command for reusing reusable data; and
generating rendering data based on the cache data when determined that the cache data does not need to be subjected to graphic processing or generating rendering data after executing the graphic processing for the cache data when determined that the cache data needs to be subjected to graphic processing.

5. The method according to claim 4, further comprising:
determining whether or not a rendering command targeted for reusable data included in the print data includes a pattern rendering command, and determining that the rendering command depends on a placement location for placement of the rendering result in a physical coordinate space when the rendering command includes the pattern rendering command.

6. The method according to claim 4, further comprising:
determining whether or not a rendering command targeted for reusable data included in the print data includes a stroke rendering command required for execution of stroke automatic adjustment processing, and determining that the rendering command depends on a placement location for placement of the rendering result in a physical coordinate space when the rendering command includes the stroke rendering command required for execution of stroke automatic adjustment processing.

7. A non-transitory storage medium on which is stored a computer program for making a computer execute:
inputting print data;
interpreting the input print data;
determining whether or not a rendering command targeted for reusable data included in the print data depends on a placement location for placement of the rendering result in a physical coordinate space based on the interpretation result of the print data;
generating cache data corresponding to the reusable data based on the interpretation result of the print data without graphic processing for the rendering command targeted for the reusable data and storing the generated cache data in a storage unit when it is determined that the rendering command depends on a placement location for placement of the rendering result in a physical coordinate space or performing graphic processing for the rendering command targeted for the reusable data, generating cache data corresponding to the reusable data based on the result of the graphic processing, and storing the generated cache data in a storage unit when it is determined that the rendering command does not depend on a placement location for placement of the rendering result in a physical coordinate space;
determining whether or not a command to be executed, which is included in the print data, is a command for reusing reusable data;
determining whether or not cache data corresponding to the reusable data stored in the storage unit needs to be subjected to graphic processing when the command to be executed is determined that the command for reusing reusable data; and
generating rendering data based on the cache data when determined that the cache data does not need to be subjected to graphic processing or generating rendering data after executing the graphic processing for the cache data when determined that the cache data needs to be subjected to graphic processing.

8. The non-transitory storage medium according to claim 7, wherein the computer program further making the computer execute:
determining whether or not a rendering command targeted for reusable data included in the print data includes a pattern rendering command, and determining that the rendering command depends on a placement location for placement of the rendering result in a physical coordinate space when the rendering command includes the pattern rendering command.

9. The non-transitory storage medium according to claim 7, wherein the computer program further making the computer execute:
determining whether or not a rendering command targeted for reusable data included in the print data includes a stroke rendering command required for execution of stroke automatic adjustment processing, and determining that the rendering command depends on a placement location for placement of the rendering result in a physical coordinate space when the rendering command includes the stroke rendering command required for execution of stroke automatic adjustment processing.

* * * * *